United States Patent

Beecken

[15] 3,644,090
[45] Feb. 22, 1972

[54] PROCESS FOR THE PRODUCTION OF ACTIVE LEAD DIOXIDE

[72] Inventor: Hermann Beecken, Cologne-Stammheim, Germany

[73] Assignee: Farbenfabriken Bayer Aktiengesellschaft, Leverkusen, Germany

[22] Filed: Sept. 9, 1969

[21] Appl. No.: 856,354

[30] Foreign Application Priority Data

Oct. 2, 1968 Germany...................P 18 00 489.2

[52] U.S. Cl..............................................23/146, 252/312
[51] Int. Cl. ......................................C01g 21/08, B01j 1/00
[58] Field of Search................23/146; 260/6, 13 R; 252/312

[56] References Cited

UNITED STATES PATENTS

| | | | |
|---|---|---|---|
| 1,506,633 | 8/1924 | Grunbaum | 23/146 |
| 2,630,457 | 3/1953 | Hansen et al. | 252/312 |

FOREIGN PATENTS OR APPLICATIONS

| | | | |
|---|---|---|---|
| 23,588 | 10/1882 | Germany | 23/146 |
| 819,275 | 9/1959 | Great Britain | 23/146 |

*Primary Examiner*—Oscar R. Vertiz
*Assistant Examiner*—Hoke S. Miller
*Attorney*—Connolly and Hutz

[57] ABSTRACT

Suspending lead sulphate, lead carbonate or mixtures thereof in water and adding to said suspension a halide and alkali in such quantitative proportions to obtain a higher basic lead halide or lead halide carbonate and thereafter oxidizing said compound with halogen or hypohalite under neutral or alkaline conditions thereby effecting precipitation of highly active lead dioxide.

9 Claims, 1 Drawing Figure

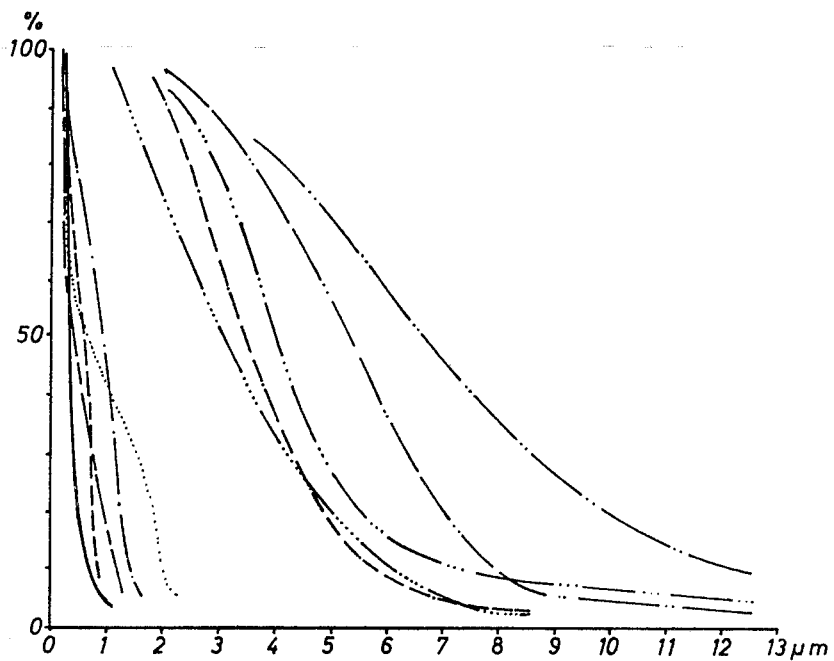

A PROCESS FOR THE PRODUCTION OF ACTIVE LEAD DIOXIDE

Apart from its use in accumulators, lead dioxide is an important oxidizing agent, especially in organic chemistry. For example, it is required in the production of dyestuffs and above all in leucobase-oxidation for the commercial production of triphenylmethane dyes. Apart from other applications in preparative organic chemistry, it is also used commercially in the production of perchloric acid and perchlorates, A product having special properties is frequently required for oxidation processes involving lead dioxide. In addition to a high degree of purity, the lead dioxide is also intended to show a high level of activity, i.e., extreme particle fineness. Thus, in the manufacture of dyestuffs for example, not only the yield but also the purity of the end product is governed by the activity of the lead dioxide used. In some cases, oxidation with lead dioxide is only displaced in the right direction if a product with the necessary reactivity is used. For example, sensitive quinones can only be obtained with a lead dioxide that has been prepared by treating lead tetra-acetate with an excess of water (Chemische Beric hte 83, 1950, page 413).

Generally, lead dioxide can be obtained by oxidizing lead (II)-salts, in which case oxidation may be carried out both electrochemically and chemically, for example in the presence of powerful oxidizing agents such as chlorine, bromine or hypochlorite. Lead dioxide is commercially produced for example by oxidizing lead (II)-acetate solutions with chloride of lime as the oxidizing agent. Another commercial process also starts with tetravalent lead. In this case, red lead is treated with dilute nitric acid. There are also some processes that start with lead (II)-chloride. In one known process for example, lead (II)-chloride is dissolved in a solution of calcium chloride and the solution thus obtained is poured into a solution of chlorinated lime with excess calcium hydroxide and then boiled. In other known processes, an aqueous suspension of lead (II)-chloride and calcium hydroxide in a molar ratio of 1:1 is prepared, chlorine being introduced into the resulting mixture. In a modification of these conventional processes, white lead oxychloride is initially prepared by trituration from lead (II)-oxide and sodium chloride, and is subsequently boiled in a solution of chlorinated lime.

In order to improve the economics of oxidation-reactions involving lead dioxide, several other known processes are concerned with converting the resulting precipitated lead sulphate back into lead dioxide by chlorination either directly or indirectly by way of lead carbonate. According to U.S. Pat. No. 1,506,633, lead sulphate for example is heated in concentrated sodium hydroxide and simultaneously treated with chlorine. British Pat. No. 819,275 discloses a process in which lead sulphate is initially converted into lead carbonate which is subsequently oxidized with chlorine in an alkaline medium.

Those conventional processes starting with lead sulphate and lead carbonate have serious disadvantages attributable not only to the consumption of large alkali and chlorine excesses but also to the formation of coarse, only moderately active products. Accordingly, these products cannot be reused either for leucobase-oxidation, in particular, or for many other applications.

A process for the production of lead dioxide with a high level of activity by treating substantially insoluble lead salts in the presence of alkali with halogens or hypohalites has now been found in which lead sulphate or lead carbonate, optionally following the removal of impurities, is reacted in aqueous suspension at temperatures of from about 0° to 60° C. with halides and alkalis in such quantitative proportions that higher-basic lead halides are formed which have an atomic ratio of Pb:halogen of 3.5:1 to 4:1 and generally correspond to the approximate composition :$PbX_2 \cdot 6PbO$ ($X$=Cl, Br or I), and in which up to 3 PbO molecules can be replaced by $PbCO_3$ where lead carbonate is used as the starting material. The resulting basic lead halides are then oxidized with halogens or hypohalites in an alkaline medium at temperatures of from about 0° C. to about 110° C. and the lead dioxide thus obtained is separated off from the reaction medium.

It is a particular advantage of the process of invention that it enables lead dioxides to be obtained even from substantially insoluble compounds of bivalent lead in the same highly active form that hitherto could only be obtained by hydrolysing lead tetra-acetate. It is therefore possible directly to reuse as starting material the lead sulphate formed by the use of lead dioxide for oxidation reactions without any need for additional complicated process stages. In some cases only the impurities have to be removed.

Although the following description is given with particular reference to lead sulphate, it may readily be applied to lead carbonate, as shown in the Examples.

The halide ions are usually supplied in the form of sodium chloride, although the choice is by no means restricted to this chloride; instead, any chlorides, bromides or even iodides, including organic halides, which liberate the aforementioned halide ions and do not promote secondary reactions under the reaction conditions, may also be used. LiCl, KCl, KBr, KI, $MgCl_2$, $CaCl_2$, $POCl_3$, $SOCl_2$ and acetyl chloride are mentioned by way of illustration.

The hydroxyl ions are preferably added in the form of alkali liquors, sodium hydroxide in particular, although other sufficiently strongly dissociated bases such as KOH and LiOH, for example, are also suitable provided they do not give rise to the formation of troublesome secondary products.

The oxidation is preferably carried out with a commercial sodium hypochlorite solution, so-called bleaching liquor, which is also abundantly available as a waste product from chlorine absorption plants of the kind used in industrial processes. Naturally, hypochlorite solutions of different origin may also be used. Thus, it is also possible to produce the hypochlorite solution directly in the reaction medium. Hypobromite solutions may also be used. Table 1 demonstrates the effect of the alkali chloride addition before the addition of the sodium hypochlorite solution, which itself is known to have a high sodium chloride content, upon the properties of the lead dioxide. 0.075 mol of $PbSO_4$ was reacted as described in Example 1 with a molar ratio of $PbSO_4$/NaOH/NaOCl of 1:2.67:1.1.

TABLE 1

| Molar ratio of $PbSO_4$ to NaCl | Volume of the $PbO_2$ sediment* | Lead Dioxide suspension Appearance | Fineness |
|---|---|---|---|
| a. 1:0 | 11.6 ml. | dark brown | coarse |
| b. 1:0 | 12.7 | Do. | Do. |
| c. 8:1 | 11.0 | Do. | Do. |
| d. 4:1 | 30.1 | light brown | very fine |
| e. 2:1 | 44.0 | Do. | Do. |
| f. 1:2 | 45.1 | Do. | Do. |
| g. 1:2** | 45.0 | Do. | Do. |
| h. 1:2*** | 46.5 | Do. | Do. |
| i. 1:4 | 54.0 | Do. | Do. |
| j. 1:6 | 59.0 | Do. | Do. |
| k. 1:8 | 31.0 | Do. | Do. |

*Measured on the suspensions washed free from salts after standing for 14 days in 4.5 cm. diameter 100 ml. glass breakers.

**NaOH added first followed by NaCl after conversion of the $PbSO_4$ into $Pb(OH)_2$.

***NaCl replaced by an equivalent quantity of 36% hydrochloric acid and compensated by the addition of more alkali.

It has been found that the molar ratio of $PbSO_4$ to NaCl and the atomic ratio of Pb to Cl can be varied within wide limits; in particular, the range of from 4:1 to 1:8 and beyond leads to finely dispersed lead dioxides. Narrow limits are imposed upon the molar ratio of $PbSO_4$ to NaOH and the Pb:OH ratio by the stoichiometry of the reaction equation:

$PbSo_4+NaOH+NaOCl \rightarrow PbO_2+Na_2SO_4+NaCl+H_2O$ On the one hand, sodium hydroxide must be present in such abundance as to guarantee the intermediate complete formation of the requisite higher-basic lead halides with a Pb/halogen ratio of 3.5 to 4. This means that a pH value in excess of 11 has to be maintained. A pH-value not lower than 7, i.e., a neutral or alkaline pH, should also be maintained during their oxidation with sodium hypochlorite or chlorine. On the other hand, however, the alkali excesses should not be too high in order to avoid the formation of hexahydroxoplumbates-(IV) as end products. Accordingly, it is preferred to operate with a molar ratio of $PbSO_4$ to NaOH of from about 1:2.0 to 1:3.5.

The hexabasic lead halide is formed extremely quickly from lead sulphate at temperatures as low as around 0° C. to 60° C. Although higher temperatures up to about the boiling point of the mixture may also be used, temperatures of this order are not economical. Even only 8 to 10 minutes after the alkali has been added to an intensively stirred suspension of lead sulphate, for example, in dilute sodium chloride solution at 20° C., the analyses of the solid product show an atomic Pb:Cl ratio of 3.5 to 4.0. The product does not undergo any change in composition even after the mixture has been heated for 15 hours to 60° C. The same atomic ratio is also obtained in cases where bromide or iodide solutions, for example, of potassium bromide or potassium iodide, are used, or in cases where lead carbonate is used as the starting material. In this case, the solid product additionally contains carbonate. Oxidation of the hexabasic lead halide or basic lead halide carbonate to the lead dioxide may be carried out at temperatures of up to 110° C., temperatures of from about 20° to 60° C. being preferred. At temperatures below 20° C., the reaction time is unnecessarily lengthened, whilst temperatures above 60° C. do not afford any advantages. Since the reaction times can be reduced to a few minutes at temperatures of from 50° to 60° C., the process according to the invention may also readily be carried out continuously provided a suitable reactor is used.

The concentration of lead sulphate in the aqueous suspension should amount to between about 10 and 20 percent by weight.

In some cases lead sulphates or lead carbonates which have been precipitated from a complex reaction medium need primarily a purification before they can be satisfactorily oxidized. This applies especially to residues from the oxidation of triphenylmethane which in may cases are contaminated by, and agglomerated with, not only dye residues but also considerable quantities of resinlike secondary products. These byproducts are only soluble in organic solvents but insoluble in water and acids. Considerable attention has already been given to this problem. For example, it has been proposed to free the lead sulphate residues from the organic material by roasting at temperatures around 500° C. and thereafter reducing them and grinding into a form suitable for reoxidation. According to another proposal, the resin-containing lead sulphate is heated in a saturated solution of common salt to which 10 percent of sodium sulphate has to be added, and the tarlike impurities are skimmed off after they have risen to the surface. Both these processes are unsatisfactory and complicated when it is considered that, in extreme cases, the resin contents can exceed 25 percent of the lead sulphate residue.

In one special embodiment of the process according to the invention, therefore, emulsifiers are added in quantities of up to about 8 percent, based on the $PbSO_4$, to the aqueous suspension of lead sulphate from the production of triphenylmethane dyes for the purposes of purification. It has proved to be particularly suitable to use for this purpose polyglycol ethers of alkanols, alkanols and alkyl phenols and nonionic emulsifiers of the kind that contain a hydrophobic radical consisting of one or more aromatic nuclei and optionally further substituted, such as those described for example in U.S. Pat. No. 2,630,457 and in German Pat. No. 1,121,814.

The advance embodied in the new regeneration process is explained with reference to comparative data on the relative oxidation yields in the production of C.I. Acid green 22 (C.I. No. 42170) (Table 2), and also by way of comparison of some grain-size distribution curves (FIG. 1) of lead dioxide suspensions from the process according to the invention with those obtained by known methods.

The grain-size distribution curves are based on measurements with a Sartorius sedimentation balance, in cases of extreme fineness using a centrifugal field.

The numbers in FIG. 1 refer to the Examples set out in Table 2. The bracketed figures relate to the numbers of the Examples. The grain size (equivalent nodule diameter) is plotted in $\mu$m. on the abscissa axis, whilst the residue is plotted as a percentage on the ordinate axis, i.e., that component of the total amount of lead oxide obtained whose particle size exceeds the particular abscissa value.

TABLE 2

[Relative optimal yields of C.I. Acid Green 22 (C.I. No. 42170) from the oxidation of the leuco compound with lead dioxide suspensions of different origin under standard conditions]

| Number | $PbO_2$-suspension prepared from— | $PbO_2$ prepared by— | Percent $PbO_2$ in the solid[a] | opt $\epsilon$[b] | Relative optimal yield[c] |
|---|---|---|---|---|---|
| 1 | $PbSO_4$ anhydrous chemically pure | Process acc. to invention, Example 5a | 94.3 | 1.11 | 97.4 |
| 2 | $PbSO_4$-residue from Production of C.I. Basic Green 4. | Process acc. to invention, Example 3a | 91.7 | 1.08 | 94.8 |
| 3 | $PbSO_4$-residue from production of C.I. Acid Green 22. | Process acc. to invention, Example 3a | 92.4 | 1.13 | 99.1 |
| 4 | $PbSO_4$-residue from production of C.I. Basic Blue 5. | Process acc. to invention, Example 2 | 90.5 | 1.135 | 99.5 |
| 5 | $PbSO_4$-residue from production of C.I. Acid Green 8. | Process acc. to invention, Example 3a | 93.2 | 1.13 | 99.1 |
| 6 | $PbCO_3$ prepared from $PbSO_4$-residue of No. 5. | Process acc. to invention, Example 4a | 91.2 | 1.09 | 95.6 |
| 7 | $PbSO_4$-residue from production of Michler hydrol. | Process acc. to invention, Example 3a | 90.2 | 1.14 | 100.0 |
| 8 | $PbSO_4$-residue as No. 7 with Na-hypochlorite in dilute NaOH. | Comparison Example 3b | 91.1 | 0.595 | 52.2 |
| 9 | $PbSO_4$ by chlorination in NaOH | U.S. Pat. 1,506,633 comparison Example 3c | 93.1 | 0.707 | 62.0 |
| 10 | $PbCO_3$ by chlorination in soda solution | British Pat. 819,275 comparison Example 4c. | 87.7 | 0.725 | 63.6 |
| 11 | $PbCO_3$ by chlorination in dilute NaOH | Comparison Example 4b | 91.3 | 0.788 | 75.8 |
| 12 | Lead tetra-acetate by hydrolysis | R. Kuhn & I. Hammer[d], comparison Example 10. | 95.8 | 1.044 | 91.6 |

[a] Dried at 60° in vacuo.
[b] $\epsilon$ opt=Extinction value at maximum of the dye yield curve where dilution is constant and the oxidation carried out with increasing quantities of lead dioxide under standardised conditions (ordinate: $\epsilon$ at $\lambda_{max}$=664$\mu$m: abscissa—mol percent $PbO_2$, based on the leuco compound).
[c] Based on No. 7.
[d] Chem. Berichte, vol. 83 (1950), pages 413–414.

The process according to the invention is illustrated by the following Examples:

EXAMPLE 1

1.268 kg. of 100 percent sulphate (4.18 mols), in the form of the moist sludge or pressed cake which is formed during the production of C.I. Basic Blue 1(C.I. No. 42025) and which in addition to colorless little dye has a dry weight consisting largely of resins that can only be dissolved in organic solvents, are stirred into 5.3 liters of tapwater, followed by the addition of 0.20 kg. of 78 percent sulphuric acid and 0.04 kg. of an emulsifier prepared by ethoxylating 3-benzyl-4-hydroxydiphenyl (U.S. Pat. No. 2,630,457), and then by 2 hours' intensive stirring at 60° to 70° C. The product is then suction-filtered while still hot and washed thoroughly with hot water until an almost colourless filtrate runs off. A pale blueish $PbSO_4$-sludge (21.9 percent of water; 99.25 percent of $PbSO_4$ in the dry substance as against 84.03 percent before purification) is obtained in a yield in excess of 99 percent. 87.8 g. of common salt (1.50 mol) are then added with intensive stirring (peripheral speed of stirrer ≧ 100 cm./sec., its walls and base being thoroughly covered) to a homogeneous suspension of 291.5 g. of the purified lead sulphate sludge (0.745 mol of $PbSO_4$) in 1 liter of tap water, and a mixture of 150 g. of 50 percent sodium hydroxide (1.875 mol) and 500 ml. of tapwater is run in quickly after a few minutes. A few minutes later, a pure white paste of basic lead chloride begins to form with some initial signs of flocculation. After the alkali has been added, the paste is stirred for another 1 to 2 hours, 584 g. of a 10.1 percent sodium hypochlorite solution are added (110 percent of the theoretical), and the mixture is heated to 30°–35° C., shortening the oxidation time to between 2 and 3 hours. During this period, the main reaction takes place (after about 1 hour), being accompanied by a slight increase in temperature of 5° to 10° C., whilst the suspension passes through an olive, dirty-brown appearance. About 30 minutes after the main reaction has begun, there are clear signs of the particles brightening and decomposing into a light, extremely fine $PbO_2$ suspension. The presence of excess hypochlorite and, provided the excess is constant, the end of the reaction too are ensured by iodometric titration of samples of the overlay clarified by centrifuging and taken at 30-minute intervals. The lead dioxide suspension is obtained neutral and free from chlorine and chloride with four to five washes, restirring with water in each case to twice the reaction volume (this amounts to about 2.3 to 2.5 liters), allowing to settle and running off the overlay. Yield: 802.6 g. of 21.42 percent lead dioxide suspension, corresponding to 174.9 g. of 100 percent $PbO_2$ (98.1 percent of the theoretical).

The lead dioxide content of the solid and the relative maximum yield in the production of C.I. Acid Green 22 (C.I. No. 42170) are shown in Table 2 and the percentage grainsize distribution of the suspension in FIG. 1.

EXAMPLE 2

Following the procedure of Example 1, 4.18 mols of lead sulphate are again used, except that this occasion the lead sulphate originates from the production of C.I. Basic Blue 5 (C.I. No. 42140) and has an extremely high resin content in its dry state. Instead of the emulsifier used in the previous Example, 0.10 kg. of the emulsifier prepared in accordance with Example 9 of German Pat. No. 1,121,814 is added. After washing, a pale blue lead sulphate sludge, 97.75 percent of whose dry weight consists of $PbSO_4$ as against 73.21 percent before purification, is obtained in an almost quantitative yield.

The contaminated sludge is dark grey-green in color and in spite of every attempt at different methods of purification, for example, by heating with dilute acids in the absence of an emulsifier, melts at 50° to 60° C. to form a tarlike mass. Neither is it possible to liberate the lead sulphate grain from its resinlike wrapping at low temperatures, with the result that any attempt at reoxidation fails.

792 g. of lead sulphate sludge thus purified (corresponding to an initial quantity of lead sulphate of 2.20 mols) are homogeneously stirred into a solution of 525 g. of sodium chloride (9 mols) in 3 liters of tapwater, after which a mixture of 450 g. of 50 percent sodium hydroxide and 1.5 liters of water is run in and the mixture is thoroughly stirred for 2 hours at 25° to 30° C. 1.47 kg. of 11.7 percent commercial sodium hypochlorite solution (110 percent of the theoretical) are then added to the creamy paste which is then kept for another 4 hours at 30° to 35° C. until the supernatant liquid does not show any further appreciable reduction in its active chlorine content. After washing in the usual way, the yield comprises 2,545 g. of 20.61 percent lead dioxide suspension corresponding to 524.5 g. of 100 percent $PbO_2$ (99.7 percent of the theoretical).

Generally, a fairly large number of lead sulphate residues, whose dry substances have resin contents of up to approximately 3 percent, need no special prepurification before the oxidation process. Instead, it is often sufficient to wash them free from dyes or to follow the procedure of Examples 1 and 2, dispensing with the addition of an emulsifier. The lead sulphates sufficiently prepurified for oxidation by this kind of acid treatment include, for example, the residues from the production of Michlers hydrol, malachite green (C.I. Basic Green 4, C.I. No. 42,000), C.I. Acid Green 8 (C.I. No. 42,050) and C.I. Acid Green 22 (C.I. No. 42,170).

EXAMPLE 3 a. 301 g. of lead sulphate sludge from the production of Michlers hydrol (purified in accordance with Example 2 but in the absence of an emulsifier; 75.6 percent dry substance with 99.1 percent of $PbSO_4$ corresponding to 0.746 mol of $PbSO_4$) are stirred to form a homogeneous suspension with 1 liter of tapwater to which 175 g. of common salt (3 mols) have been added. To the suspension thus obtained is now added a mixture of 180 g. of 45 percent sodium hydroxide and 500 ml. of water, followed by 2 hours' intensive stirring. The product is oxidized to lead dioxide by pouring in 500 g. of 13 percent sodium hypochlorite solution and heating to 30° C. A very light fine $PbO_2$ is obtained which, 3 hours after the sodium hypochlorite solution has been added, is washed with water in the usual way.

Yield: 829.14 g. of 20.42 percent dioxide suspension corresponding to 169.4 g. of 100 percent $PbO_2$ (95.2 percent of the theoretical). $PbO_2$-content of the solid (dried in vacuo at 60° C.): 90.2 percent. Volume of the $PbO_2$-sediment after at least 24 hours' settling: 650 ml. (as measured in a 1 liter glass beaker).

b) The procedure described at (a) is repeated without the addition of common salt, the $PbSO_4$ being stirred with alkali for 24 hours rather than 2 hours. The sediment volume remains practically unchanged although the lead sulphate is soon completely converted to lead hydroxide. The product is then oxidized for 15 hours at 30° C. with 560 g. of 11 percent sodium hypochlorite solution, dark brown coarse lead dioxide being obtained after washing.

Yield: 694.3 g. of 23.47 percent lead dioxide suspension corresponding to 163.0 g. of 100 percent $PbO_4$ (91.7 percent of the theoretical)
$PbO_2$-content of the solid: 91.1 percent.
Volume of the $PbO_2$-sediment after 24 hours: 170 ml.
c) Comparison Example according to U.S. Pat. No. 1,506,633:

301 g. of the same lead sulphate sludge as at (a) are introduced with stirring into a solution of 113 g. of sodium hydroxide (2.83 mols) in 160 g. of water, so that a 30 percent sodium hydroxide solution is obtained allowing for the water present in the sulphate (73 g.). Chlorine gas is then introduced, the temperature of the reaction medium being kept above 80° C. If the mixture becomes black-brown in color and if its pH-value falls to 6-7, the supply of chlorine is stopped and the product heated for another hour to 80°-90° C., after which it is left to cool and the dark-colored coarse lead dioxide is washed in the usual way by decantation.

Yield: 576.1 g. of 27.6 percent lead dioxide suspension corresponding to 159.0 g. of 100 percent $PbO_2$ (89.4 percent of the theoretical). $PbO_2$ content of the solid: 93.1 percent. Volume of the $PbO_2$-sediment after 24 hours: 163 ml.

The use of sodium hypochlorite solution instead of chlorine under otherwise the same conditions leads to a very similar result: dark-brown coarse-grained lead dioxide whose grain-size distribution curve is shown in FIG. 1 under No. 9 I.

EXAMPLE 4 a) 276.8 kg. of deep-green lead sulphate sludge containing Pb-dye compounds from the production of C.I.Acid Green 8 (C.I. No. 42,050), purified in accordance with Example 1 but in the absence of an emulsifier (82.2 percent dry substance with 96.85 percent of $PbSO_4$ corresponding to 0.727 kmol of $PbSO_4$) are reacted with stirring to form lead carbonate by heating for 3 hours to approximately 80° C. in a solution of 100 kg. of anhydrous soda in 1,000 liters of tapwater. The lead carbonate is then squeezed out and washed with water until an almost colorless filtrate is obtained. A lump-free suspension is prepared from the now pale green carbonate sludge by stirring it into a solution of 175 kg. of common salt in 1,000 liters of water. 150 kg. of 50 percent sodium hydroxide which have been diluted beforehand with 500 liters of water, are then added to the suspension with continued vigorous stirring and 1.5 hours later 518 kg. of 11.3 percent commercial sodium hypochlorite solution are run into the resulting blueish, bulky paste. Oxidation is carried out at 30° C. After 5 hours, the light brown fine suspension is washed and gives the following yield: 882.6 kg. of 19.65 percent lead dioxide suspension corresponding to 173.6 kg. of 100 percent $PbO_2$ (99.8 percent of the theoretical).
$PbO_2$-content of the solid: 91.2 percent Volume of the $PbO_2$-sediment of a quantity of the suspension corresponding to 0.75 mol of $PbO_2$ (after 24 hours): 610 ml. Analysis of the basic lead chloride carbonate:

| Found | Pb 82.2 | Found | Pb/Cl=3.91 |
|---|---|---|---|
| | Cl 3.6 | | Pb/CO$_2$=2.644 |
| | CO$_2$ 7.2 | | CO$_2$/Cl=1.478 | b) Comparison test with no chloride ions added: 1,558 g. (5.83 mols) of lead carbonate, in the form of the sludge obtained in accordance with 4a), are stirred with water to form 7.5 liters of a suspension to which 1 liter of 50 percent sodium hydroxide (19 mols) is slowly added at 20° to 25° C. The product is then oxidized with thorough stirring at 20° C. to a maximum of 30° C. by the introduction into it of chlorine at the rate of approximately 5 liters per hour. After some 30 to 36 hours, the solution is still only weakly alkaline, so that another 320 ml. of 50 percent sodium hydroxide (6.08 mols) are added and more chlorine is introduced until the pH value of the solution drops back to between 8 and 9. Oxidation is over when no more bivalent lead is dissolved out after a suction-filtered sample of the lead dioxide has been heated with 10 percent acetic acid, and detected following the addition of $H_2SO_4$. After washing in the usual way, a dark brown, relatively coarse-grained lead dioxide suspension is obtained.

Yield: 4,000 g. of 29.0 percent lead dioxide suspension corresponding to 1,160 g. of 100 percent $PbO_2$ (83.3 of the theoretical).

$PbO_2$ content of the solid: 91.3 percent
Volume of the $PbO_2$ sediment of a quantity of the suspension corresponding to 0.75 mol of $PbO_2$ (after 24 hours): 180 ml.

c) Comparison Example according to British Pat. No. 819,275:
458 g. of the purified lead sulphate sludge also used in 3a) (corresponding to 343 g. of $PbSO_4$=1.13 mol) are initially heated with stirring for 3 hours to 80°-90° C. in a solution of 265 g. of sodium carbonate (2.50 mol) in 700 g. of water, after which 96 g. of chlorine (1.35 mol) are introduced over a period of 1.5 hours at 80°-90° C. into the soda-alkaline suspension of the lead carbonate formed. By checking and adding a little soda where necessary, the pH value of the mixture is prevented from falling below 7. The lead carbonate is soon converted into brown-black lead dioxide which, by virtue of its particle coarseness, can be washed by filtration under suction and treatment with water on suction filter.

Yield: 636.1 g. of 33.5 percent lead dioxide suspension corresponding to 213.0 g. of 100% $PbO_2$ (78.9 percent of the theoretical).

$PbO_2$ content of the solid: 87.7 percent Sediment volume of a quantity of the suspension corresponding to 0.75 mol of $PbO_2$ (after 24 hours): 270 ml.

EXAMPLE 5 a) 227.5 g. (0.75 mol) of anhydrous lead sulphate (chemically pure, precipitated) are introduced into a thoroughly stirred solution of 87.8 g. of sodium chloride (1.5 mol: chemically pure) in 1 liter of distilled water (3-liter glass beaker with an anchor stirrer effectively covering the walls). After a lump-free suspension has been obtained, a mixture of 180 g. of 45 percent sodium hydroxide (1.875 mols) and 500 ml. of distilled water is added. This is followed by stirring for 1 hour at 20° C., after which a sample (A) is taken. After another 2 hours' heating to 60° C., a second sample (B) is taken. The two samples are carefully washed free from salts and alkali, dried in vacuo at 40° C. and then analyzed. There are no signs of any sulphate ions in either. $PbCl_2 \cdot 6$ (1617.2)
Calculated: Pb 89.63%, Cl 4.38%, atomic Pb:Cl ratio 3.50
Found Pb 87.30%, Cl 4.20%, atomic Pb:Cl ratio 3.57 (A)
Found Pb 87.57%, Cl 4.30%, atomic Pb:Cl ratio 3.56 (B)

For oxidation, 500 g. of an 11.79 percent commercial sodium hypochlorite solution (corresponding to 58.5 g. of chlorine=110 percent of the theoretical) are added to the pasty suspension which is then stirred for 1 hour at 60° C. Even after only 15 minutes, only a minimal reduction in the active chlorine content can still be iodometrically detected in the supernatant liquid centrifuged off, the titre remaining constant after 25 minutes. A very light, yellowish-brown fine $PbO_2$ suspension is obtained which, after four to five washes with water to a washing volume of 5 liters (reaction volume approximately 2.3 to 2.5 liters), is neutral and free from chlorine (ide).

Yield 842.0 g. of 20.0 percent lead dioxide suspension corresponding to 168.4 g. of 100% $PbO_2$ (94.6 percent of the theoretical).

Instead of lead sulphate, the carbonate may be used without any change in the result, or alternatively these compounds may be precipitated beforehand from soluble lead compounds and the following procedure for example adopted:

b) A solution of 100 g. of sodium sulphate in 500 ml. of water is added to 750 ml. of 1m $Pb(NO_3)_2$-solution. 175 g. of sodium chloride and a solution of 75 g. of sodium hydroxide in 350 ml. of water are then added to the resulting PbSo₄-suspension with vigorous stirring in the usual way. After 2 hours, the product is oxidized for 3 hours at 30° C. with 500 g. of an 11.7 percent sodium hypochlorite solution. After the very fine light brown suspension has been washed, the yield comprises 876.6 g. of 20.0 percent lead dioxide suspension, corresponding to 175.2 g. of 100% $PbO_2$ (97.7 percent of the theoretical).

$PbO_2$-content of the solid: 93.6 percent

Volume of the $PbO_2$-sediment (after 24 hours): 595 ml.

EXAMPLE 6

272.6 g. of prepurified lead sulphate paste (83.46 percent dry substance corresponding to 0.75 mol of $PbSO_4$) are homogeneously stirred with 1 liter of water, 50.6 g. (0.375 mol.) of sulphuryl chloride are poured in, followed by the addition of a mixture of 300 g. of 45 percent sodium hydroxide (3.375 mol) and 500 ml. of water. The product is then intensively stirred for 1 hour at 30° C., followed by the addition of 585 g. of 10.0 percent sodium hypochlorite solution (110 percent of the theoretical) for the purposes of oxidation. After stirring for 3 hours at 30° C., a very fine and light lead dioxide suspension is obtained, being washed in the usual way.

Yield: 682.1 g. of 25.22 percent lead dioxide suspension corresponding to 172.0 g. of 100% $PbO_2$ (95.7 percent of the theoretical).

$PbO_2$-content of the solid: 93.4 percent

Volume of the $PbO_2$-sediment (after 24 hours): 450 ml.

EXAMPLE 7

272.6 g. of lead sulphate sludge (0.75 mol of $PbSO_4$, cf. Example 6) are stirred into 1 liter of water, followed by the addition first of 9.54 g. (0.225 mol) of lithium chloride and then of 146.7 g. of 45 percent sodium hydroxide (1.65 mol), diluted with 500 ml. of water. The product is then stirred for 30 minutes at 30° C. After 4.5 hours' oxidation at 30° C. as in Example 6 and the usual wash, a finely dispersed, light $PbO_2$-suspension is obtained.

Yield: 794.5 g. of 21.8 percent lead dioxide suspension corresponding to 173.3 g. of 100% $PbO_2$ (96.6 percent of the theoretical).

$PbO_2$-content of the solid: 93.0 percent

Volume of the $PbO_2$-sediment (after 24 hours): 515 ml.

EXAMPLE 8

44.6 g. of potassium bromide (0.375 mol) and 1 liter of distilled water are added to 272.6 g. of lead sulphate paste (0.75 mol of $PbSO_4$, cf. Example 6) and the mixture is stirred to form a homogeneous suspension and thereafter a mixture of 180 g. of 45 percent sodium hydroxide (1.875 mol) and 500 ml. of water is added. The product is stirred for 2 hours at 20° to 25° C. and then oxidized for 4 hours at 30° C. with a commercial sodium hypochlorite solution as described in Example 7. After the very light and fine suspension has been washed, the yield comprises:

696.1 g. of a 24.76% $PbO_2$ suspension corresponding to 172.2 g. of 100 percent lead dioxide (96.0 percent of the theoretical).

$PbO_2$-content of the solid: 97.7 percent.

Volume of the $PbO_2$-sediment (after 24 hours): 450 ml. Analysis of the basic lead bromide: Approximately 40 ml. of the suspension of the basic bromide are removed just before the sodium hypochlorite solution is added, suction-filtered and washed free from salts and alkali. The finely crystalline filter residue tinged with pale yellow was dried in vacuo at 40° C. for analysis (4.0 g).

$PbBr_2 \cdot 6 PbO$ (1706.15)

Calculated: Pb 85.0%, Br 9.37%, atomic Pb:Br ratio = 3.50

Found: Pb 83.1%, Br 9.40%, atomic Pb:Br ratio = 3,41

EXAMPLE 9

272.6 g. of lead sulphate paste (0.75 mol of $PbSO_4$, cf. Example 6) are stirred with 1 liter of water, followed by the addition first of 35.7 g. of potassium iodide (0.215 mol) and then 10 minutes later of a mixture of 147.0 g. of 45 percent sodium hydroxide (1.653 mol) and 500 ml. of water. After 1 to 2 hours' intensive stirring, sodium hypochlorite solution is added as usual to the pale yellow bulky basic iodide formed. In contrast to the previous Examples, 110 percent of the theoretical quantity of sodium hypochlorite solution does not promote any appreciable oxidation of the lead (II)-compound, even at 80° C., due to the formation of hypoiodite, although oxidation does proceed smoothly at 30° to 35° C. when a relatively large excess of sodium hypochlorite solution (in this case 993.0 g. of 11.8 percent commercial sodium hypochlorite solution, corresponding to 117.0 g. of chlorine or 220 percent of the theoretical) is used. After washing in the usual way, a finely dispersed light brown $PbO_2$ is obtained.

Yield: 1025.0 g. of 16.41 percent lead dioxide suspension corresponding to 168.2 g. of 100% $PbO_2$ (93.8 percent of the theoretical).

$PbO_2$-content of the solid: 91.6 percent

Volume of the $PbO_2$-sediment (after 24 hours) : 524 ml.

Analysis of the hexabasic lead iodide (prepared in accordance with Example 9, but with a molar ratio of $PbSO_4$:KI:NaOH=1: 0. 5:3.375):

$PbI_2 \cdot 6 PbO$ (1,800.14)

Calculated: Pb 80.5%, I 14.1%, atomic Pb:I ratio = 3.50

Found: Pb 79.2%, I 14.1%, atomic Pb:I ratio = 3.44

The addition of sodium fluoride instead of the bromide in Example 8 does not yield a basic salt and, accordingly, on completion of oxidation, gives a dark brown, relatively coarse and substantially inactive lead dioxide.

EXAMPLE 10

Comparison Example according to Chem. Ber. Vol. 83 (1950), pages 413–414:

133.0 g. of recrystallized lead tetra-acetate (0.30. mol) are carefully rubbed in portions in a mortar with a total of 800 ml. of water and the portions combined in a glass beaker are made up with water to 2 liters and then intensively stirred for another 2 hours. The very fine, light, lead dioxide suspension is then washed with water in the usual way by decantation.

Yield: 621.1 g. of an 11.14 percent lead dioxide suspension, corresponding to 69.2 g. of 100% $PbO_2$ (96.4 percent of the theoretical).

$PbO_2$ content in the solid: 95.8 percent

Volume of the $PbO_2$-sediment after 24 hours: 200 ml. and 500 ml. based on 0.75 mol of $PbO_2$. Grain-size distribution curve, cf. No. 12 in FIG. 1.

What is claimed is:

1. In the process of producing lead dioxide of high activity by treating substantially insoluble lead salt selected from the group consisting of lead sulphate, lead carbonate or a mixture thereof in the presence of alkali with a halogen or hypohalite, the improvement which comprises forming an aqueous suspension of said lead salt and treating said suspension at a temperature of from 10° to 60° C. with a chloride in an atomic ratio of Pb:Cl of about 4:1 to 1:8 and with sodium hydroxide in a molar ratio of Pb salt:NaOH of from 1:2 to 1:3.5 to produce higher-basic lead halide, halide carbonate or a mixture thereof with an approximate atomic ratio of Pb:halogen of between 3.4:1 and 4.0:1, thereafter oxidizing said higher-basic lead compound with halogen or hypohalite at a temperature of from about 0° to 110° C. and at a pH of more than 7 and recovering resulting precipitated highly active lead dioxide.

2. The process of claim 1 wherein said oxidation is carried out with sodium hypochlorite solution.

3. The process of claim 2 wherein said oxidation is carried out at a temperature of from 20° to 60° C.

4. The process of claim 1 wherein inpurities in said substantially insoluble lead salt are initially separated at a temperature of up to 100° C. in the presence of an emulsifier in an amount of up to 10 percent by weight, based on the dry weight of the residue.

5. The process of claim 4 wherein said impurities are separated at a temperature of from about 60° to 80° C.

6. The process of claim 4 wherein said emulsifier is a polyglycol ether of an aliphatic alcohol or of a phenol.

7. The process of claim 4 wherein said emulsifier is an ethoxylated nonyl phenol.

8. The process of claim 4 wherein said emulsifier is an ethoxylated benzylhydroxydiphenyl.

9. The process of claim 4 wherein said emulsifier is an ethoxylated $\alpha$-arylethyl phenol.

* * * * *